(12) United States Patent
Piazza

(10) Patent No.: US 6,510,950 B1
(45) Date of Patent: *Jan. 28, 2003

(54) APPARATUS FOR STORING AND TRANSFERRING PLANAR PRODUCTS, PROVIDED WITH PARKING STATION

(76) Inventor: Antonio Piazza, Via Tuzzi, 87-36015 Schio (Prov. of Vicenza) (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/633,920

(22) Filed: Apr. 15, 1996

(30) Foreign Application Priority Data

Apr. 20, 1995 (IT) .......................... VI95A0063

(51) Int. Cl.⁷ ................................. A47F 5/025
(52) U.S. Cl. ................... 211/1.57; 211/41.14
(58) Field of Search ............... 211/1.57, 41.14, 211/122, 41.1

(56) References Cited

U.S. PATENT DOCUMENTS

| | | | | |
|---|---|---|---|---|
| 1,213,032 A | * | 1/1917 | Smith .................. | 211/41.14 X |
| 3,730,358 A | * | 5/1973 | Oji ............................. | 211/1.57 |
| 3,744,184 A | * | 7/1973 | Niemi et al. .................. | 49/125 |
| 3,973,504 A | * | 8/1976 | Knudsen ................. | 211/1.57 X |
| 5,072,838 A | * | 12/1991 | Price et al. ............. | 211/122 X |
| 5,333,983 A | * | 8/1994 | Hatouchi et al. ...... | 211/1.57 X |
| 5,505,574 A | * | 4/1996 | Piazza ................. | 211/41.14 X |

FOREIGN PATENT DOCUMENTS

SE 303620 * 9/1968 ................ 211/1.57

* cited by examiner

*Primary Examiner*—Gregory J. Strimbu
(74) *Attorney, Agent, or Firm*—Guido Modiano; Albert Josif; Daniel O'Byrne

(57) ABSTRACT

The storage system has two base members (1, 2) that support rails (3) that allow the carriages (4), provided with inclined frames (5), to slide longitudinally in both directions. At the opposite ends of the base members, there are two parallel transverse tracks (6, 6') that lie at right angles to the base members and in which transfer units (7) run in order to transfer from one base member (1) to the other (2), the carriages (4) which support the inclined frames (5) and which have been transferred onto the transfer units (7). Parking stations (8, 9) are provided to pick up or deposit the material, while movement of the carriages (4) from one base member (1) to the other (2) along the transverse tracks (6, 6') is.

3 Claims, 7 Drawing Sheets

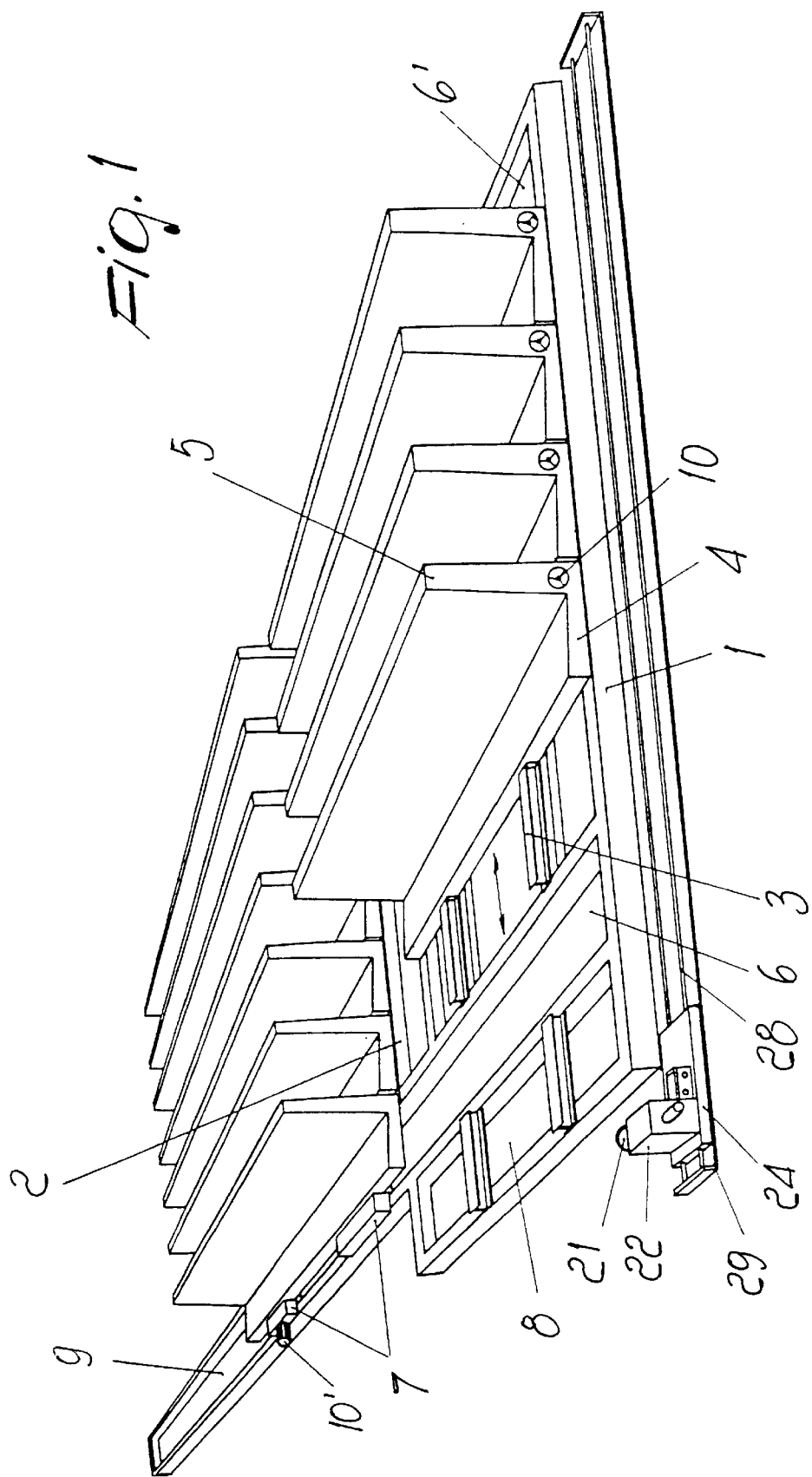

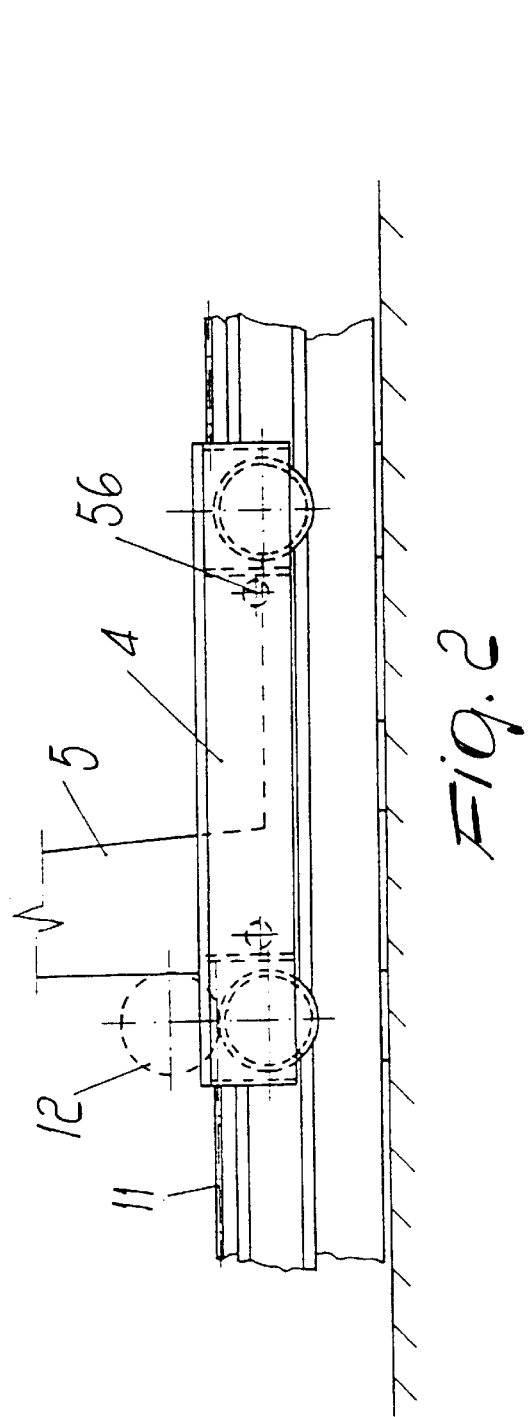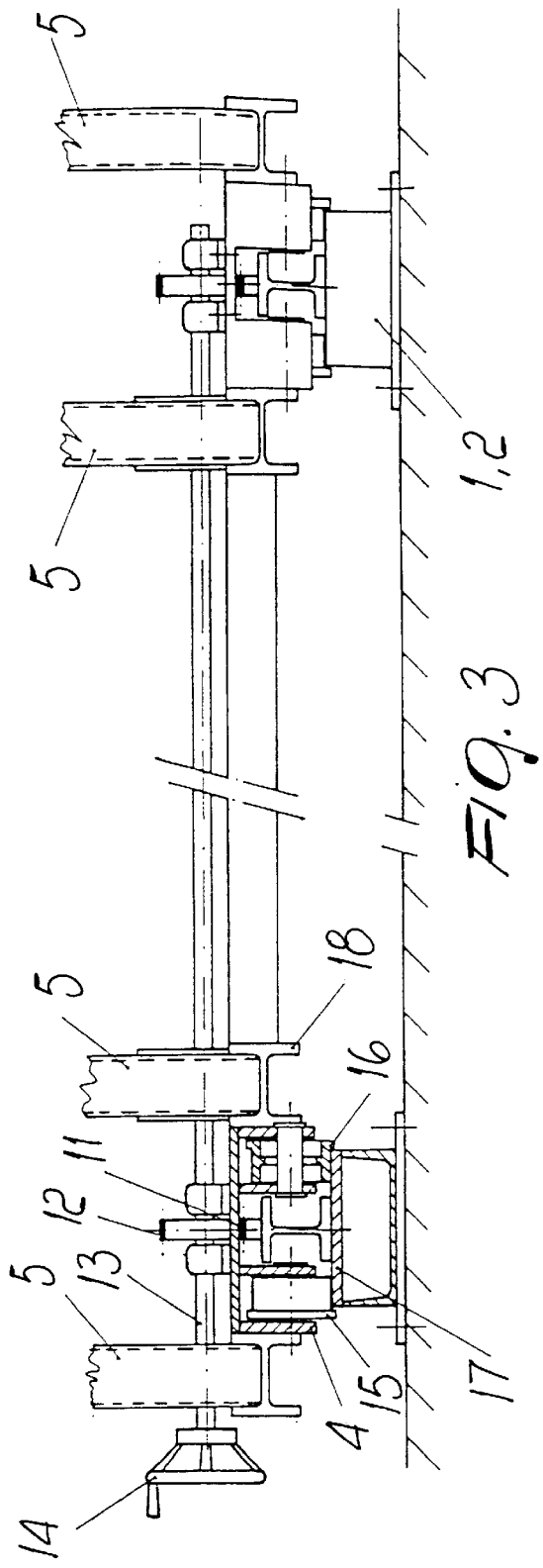

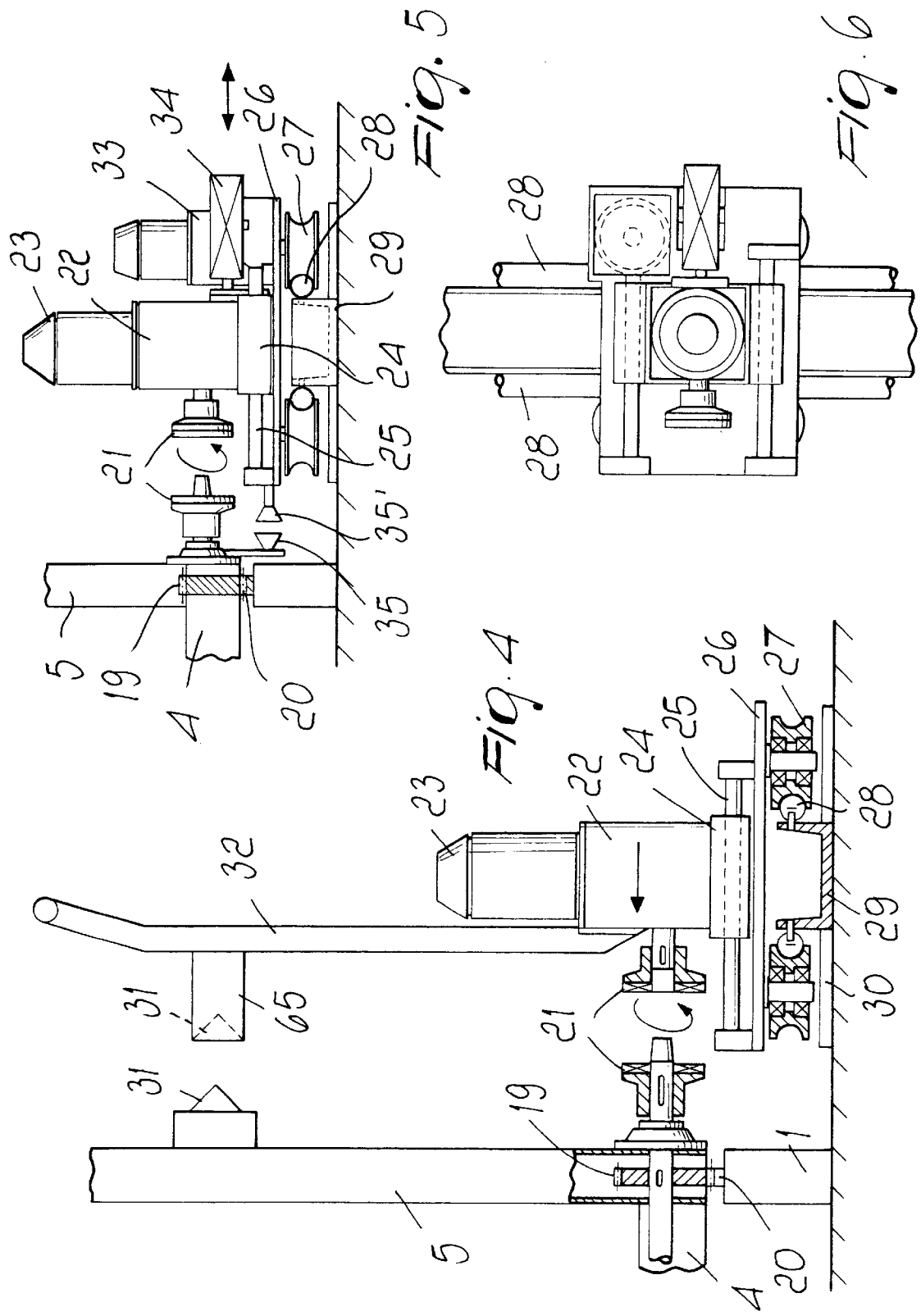

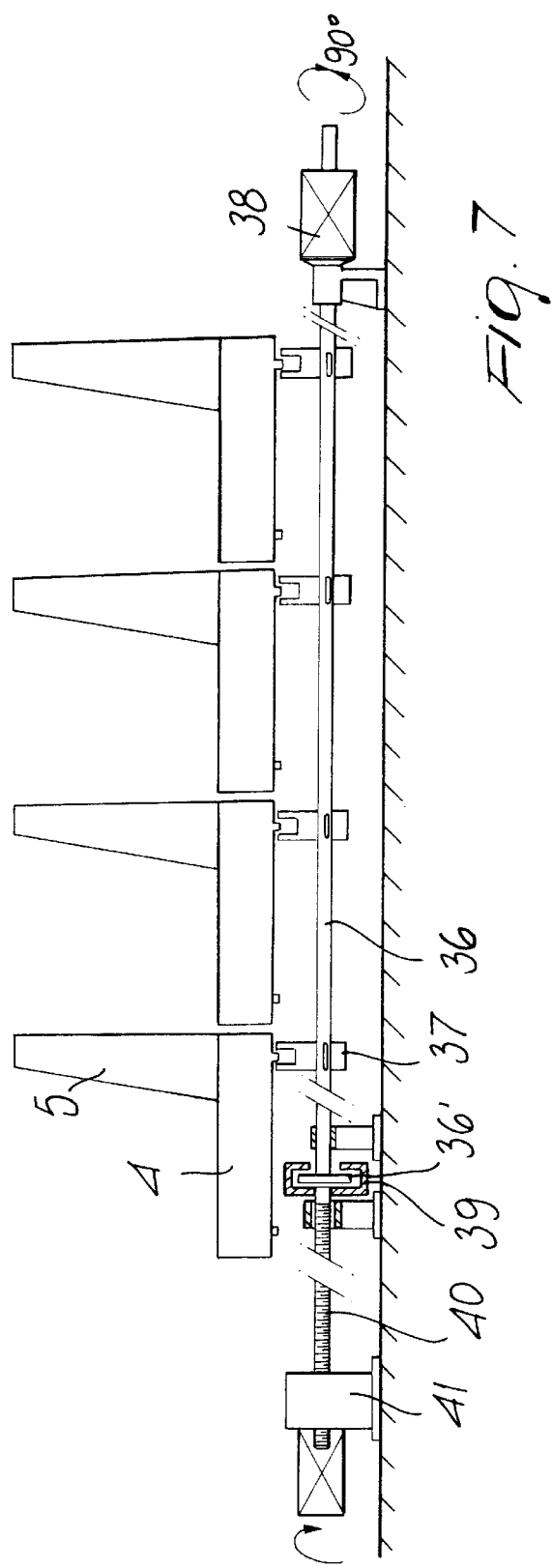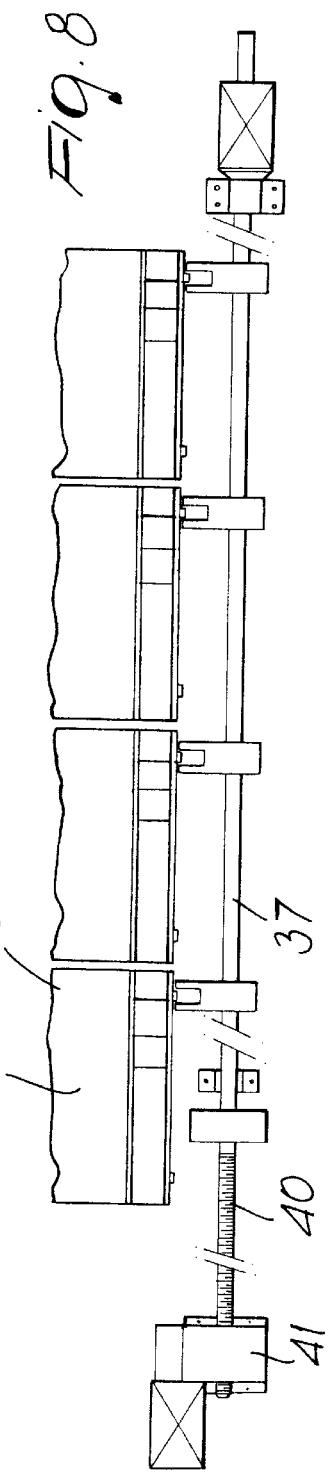

APPARATUS FOR STORING AND TRANSFERRING PLANAR PRODUCTS, PROVIDED WITH PARKING STATION

BACKGROUND OF THE INVENTION

The present invention relates to a storage system for planar products.

When storing planar products such as panes of glass or similar materials, care has to be taken to correctly store the materials in such a manner that they do not become damaged or broken. As known, large sheets of glass will break under their own weight if supported in an incorrect manner.

Floor-standing racks are often used for storing planar materials, which are usually inclined, and which require personnel to manually move the uppermost planar products to access the underlying planar products. When the materials are removed from the storage racks, they usually have to be handled manually and loaded onto some means of transport, such as a wheeled trolley or a fork-lift truck.

Handling planar products, for example during industrial manufacturing processes and/or in stores, warehouses or other storage facilities employing floor-standing racks is problematical. The significant weight and bulk of many planar materials make handling difficult, and in the case of materials such as glass, extra care has to be taken because of the inherent fragile nature of the material.

Safety at the workplace is also an important factor. Such planar materials may be extremely heavy, have sharp edges or corners, and be difficult or even impossible to grip effectively because of the bulk involved. Handling such materials can present a serious safety hazard for personnel.

Organization of the stored materials, according to specific characteristics, is also important, if time is not to be wasted when attempting to locate one specific type of material among the many different types which may be stored.

SUMMARY OF THE INVENTION

Accordingly, an aim of the invention is to provide a storage system for planar products such as panes of glass or similar materials, which enables the products to be stored in such a manner that they do not become damaged or broken.

Within the above aim, an object of the invention is to provide a storage system for planar products which minimizes the manual handling of the planar products at the storage place and increases safety for personnel.

Another object of the invention is to provide a storage system for planar products which minimizes the manual handling of the planar products and which permits optimization of the organization and inventory of the stored materials.

With the above-mentioned aim and objects in view, there is provided a storage system for planar products as defined in the appended claims.

The present invention provides a storage system with movable supporting carriages that carry inclined frames adapted to support planar products, such as panes of glass or of other materials, but also frames for objects having a different shape, whose innovative characteristic is that the carriages supporting the frames move at right angles with respect to the bases on which they slide and also longitudinally, on parallel transverse tracks that are arranged at the ends of said bases, in order to remove or insert, in one or more preset points, the items to be stored.

Parking positions are provided for this purpose both on the parallel tracks and on extensions of said bases.

Of course, there are appropriate safety devices to avoid danger for the personnel.

BRIEF DESCRIPTION OF THE DRAWINGS

The invention is now described hereinafter in greater detail with the aid of the accompanying drawings, wherein:

FIG. 1 is a perspective view of the storage system with carriages according to the invention;

FIG. 2 is a side view of one the of the carriages with inclined frame;

FIG. 3 is a sectional front view of the frame and the carriage;

FIG. 4 is a sectional front view showing a frame and a unit for manual movement of the carriages;

FIG. 5 is a partial front view of a unit for the automatic movement of the carriages;

FIG. 6 is a partial top view of the unit of FIG. 5;

FIG. 7 is a lateral elevation view of a different embodiment of the device for the movement of the carriages, with a coupling arranged below the carriages;

FIG. 8 is a top plan view of another embodiment of the movement of the carriages, with lateral coupling thereof;

DESCRIPTION OF THE PREFERRED EMBODIMENTS

Figure 9:
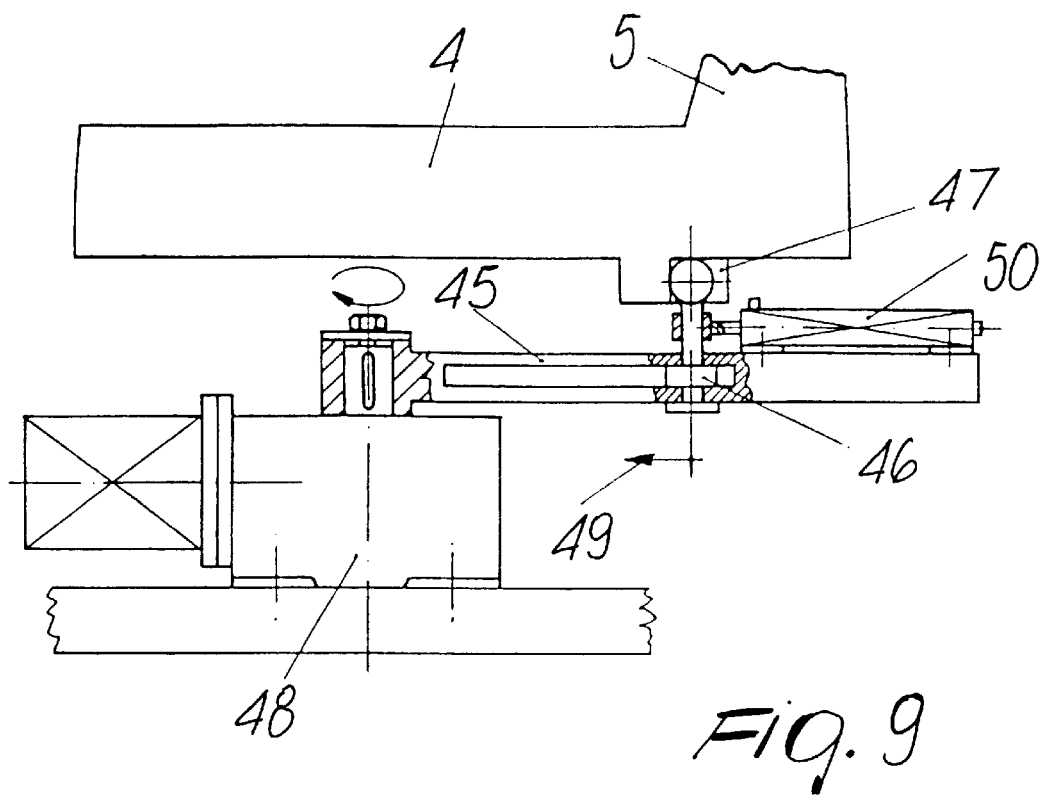
FIG. 9 is a partially sectional side view of a device for moving the carriage, in an engagement position.

In the particular embodiment shown in FIG. 1, the storage system is formed by at least two base members 1 and 2 each provided with overlying rails 3. Carriages 4, supporting frames 5, which are advantageously inclined, slide longitudinally in both directions along the rails 3.

The base members are mutually connected, at their opposite ends, by two parallel transverse tracks 6, 6' that support transfer units 7. In this manner, the carriages 4 that support the frames 5, which have been transferred onto said transfer units, can be transferred from one base member to the other.

One or more parking stations 8 and 9, also provided with rails, are used to carry out removal or deposition, by the user, of the material to be stored, nonetheless allowing at the same time the transfer of the carriages from one base member to the other along the transverse tracks.

The movement and transfer of the individual carriages can be actuated by pushing by hand, or by means of a handwheel-operated kinematic trasmission means, or also by means of appropriate motorized units.

If handwheel-based movement is provided, handwheels 10 and 10' are mounted both on the carriages 4 and on the transfer units 7, which can move along the tracks 6 and 6', to move the carriages from one base member to the next.

FIGS. 2 and 3 more clearly illustrate the details related to the means for the advancement of the carriages 4, which support the inclined frames 5; said means comprise for example racks 11 on which pinions 12 mesh; said pinions are mounted on a shaft 13, which is turned for example by means of the handwheel 10.

Flanged wheels 15 and 16 that can run along the guiding rails 17 and are part of the carriages 4 allow the movement of the carriages 4. Track retainer rollers 56 are also provided to cooperate with the rails to stabilize the movements of the transfer units.

The pairs of flanged wheels 15 and 16 on the sides of the guiding rails 17 offer greater stability for the movement of the carriages 4.

Beams 18 stiffen the carriages 4, allowing them to carry very heavy materials that are deposited thereon and rested on the frames 5.

In the embodiment shown in FIG. 4, the carriage 4, which supports the frame 5, is provided with pinions 19 that can move on the racks 20 and are turned by the coupling 21, which is actuated by a mechanism 22. The mechanism 22 is in turn actuated by an electric motor 23; the entire assembly is mounted on the slider 24, which is movable along the shafts 25, which are in turn mounted on the plate 26, provided with guiding rollers 27 in a downward region; said rollers run on the rails 28 that are located on the sides of the profiled element 29 that is rigidly coupled to the base plate 30.

A pin 65 mounted on the handling unit 32 is rigidly coupled to the mechanism 22 and has a conical tip cavity 31 that interacts with a point 31', which is rigidly coupled to the frame 5. Engagement of the point 31' in the cavity 31 provides precise coupling between the handling unit 32 and the frame 5, thus providing the exact mating of the coupling 21.

In the embodiment shown in FIGS. 5 and 6 and as also shown in FIG. 4, the carriage 4 that supports the frame 5 is provided with pinions 19 that can move on the racks 20 and are turned by the coupling 21, actuated by the mechanism 22, which is driven by the electric motor 23; the entire assembly is mounted on the slider 24, which can move along the shafts 25. The shafts 25 are rigidly coupled to the plate 26, provided with guiding rollers 27 that slide on the rails 28, which are located on the sides of the profiled element 29.

An appropriate motorized unit 33 allows the transfer of the system, which is guided longitudinally by the rails 28.

A pneumatic or hydraulic cylinder 34, actuated by the electromechanical or electronic device, such as for example a photoelectric cell 35–35', moves the movable mechanism 22 so as to provide the perfect mating of the coupling 21.

It is of course possible to provide multiple transfer units along the same working line.

FIG. 7 illustrates a multiple transfer device for the carriages 4 that support the inclined frames 5, with a shaft 36 that is mounted below the carriages and with engagement elements 37 that are turned by the actuation unit 38 through 90°, in order to release or engage the carriages.

The shaft 36, which is rigidly coupled to the disk 36', is moved by the coupling 39, which is rigidly coupled to a threaded shaft 40 that is turned by a motorized unit 41, which thus moves the shaft 36 together with the carriages 4 that are engaged therewith.

In FIG. 8, the shaft 42, driven by the threaded shaft 43, actuated by the unit 44, is arranged on the side of the carriages 4.

Figure 11:
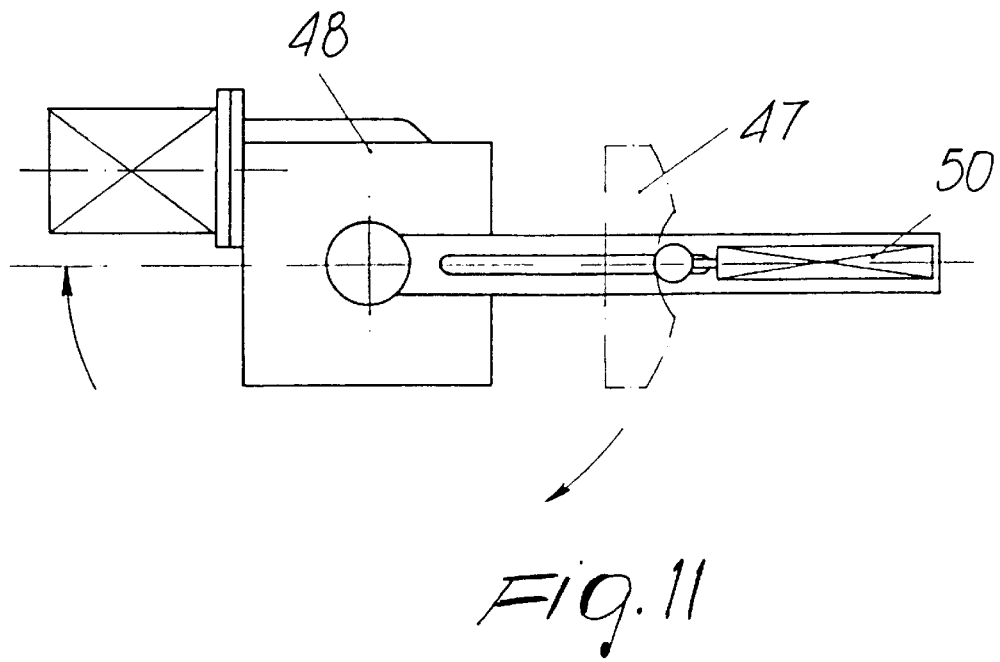
FIG. 11 is a top plan view of the device of FIG. 10 in engagement position.

FIGS. 9 and 11 are views of another system for the engagement and translatory motion of the carriages 4, which support the inclined frames 5; said system comprises a particular slotted lever 45, inside which the hub with spherical head 46 slides; said hub moves when the lever is turned by the motorized actuation unit 48, after engaging the traction unit 47 that supports the carriage 4.

Figure 10:
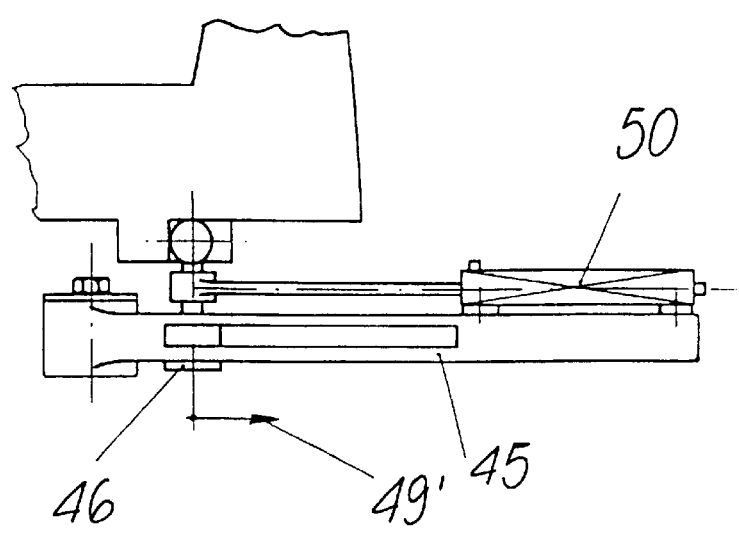
FIG. 10 is a view of the device of FIG. 9, shown in an engagement-ending position.

As shown in FIGS. 10 and 11, the lever 45, by rotating through 180°, provides the stroke, in the direction of the arrows 49–49', of the hub with spherical head 46 and thus the preset movement of the carriage.

The pneumatic or hydraulic cylinder 50 returns the hub with spherical head 46 to its initial position, after the lever 45 has also been positioned in the starting position, turning through a further 180°, so as to engage the next carriage.

Figure 12:
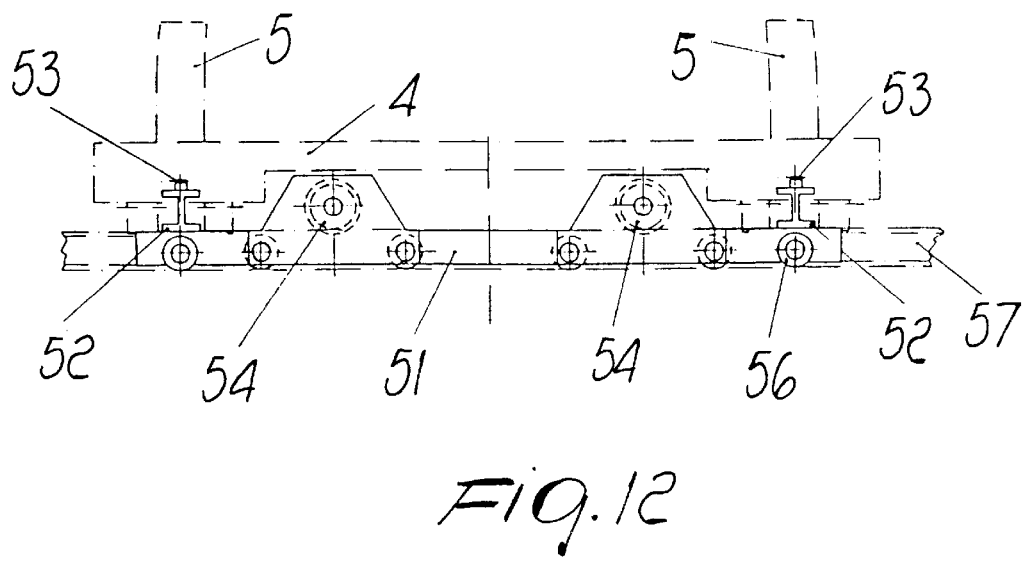
FIG. 12 is a side view of another embodiment of a unit for longitudinal transfer of the carriages.
Figure 13:
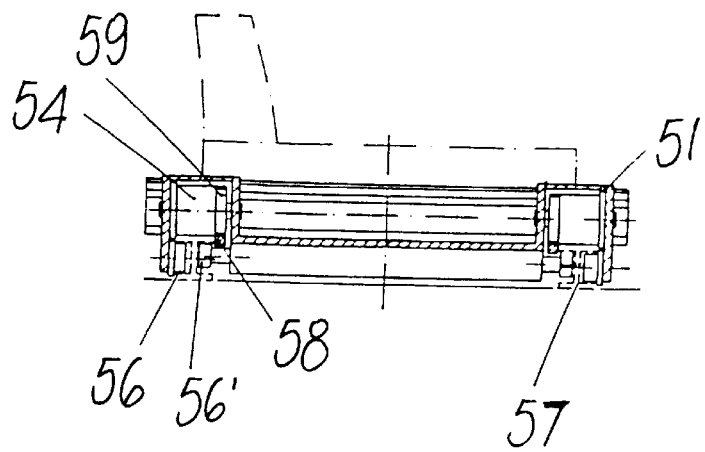
FIG. 13 is a sectional view of the unit of FIG. 12.
Figure 14:
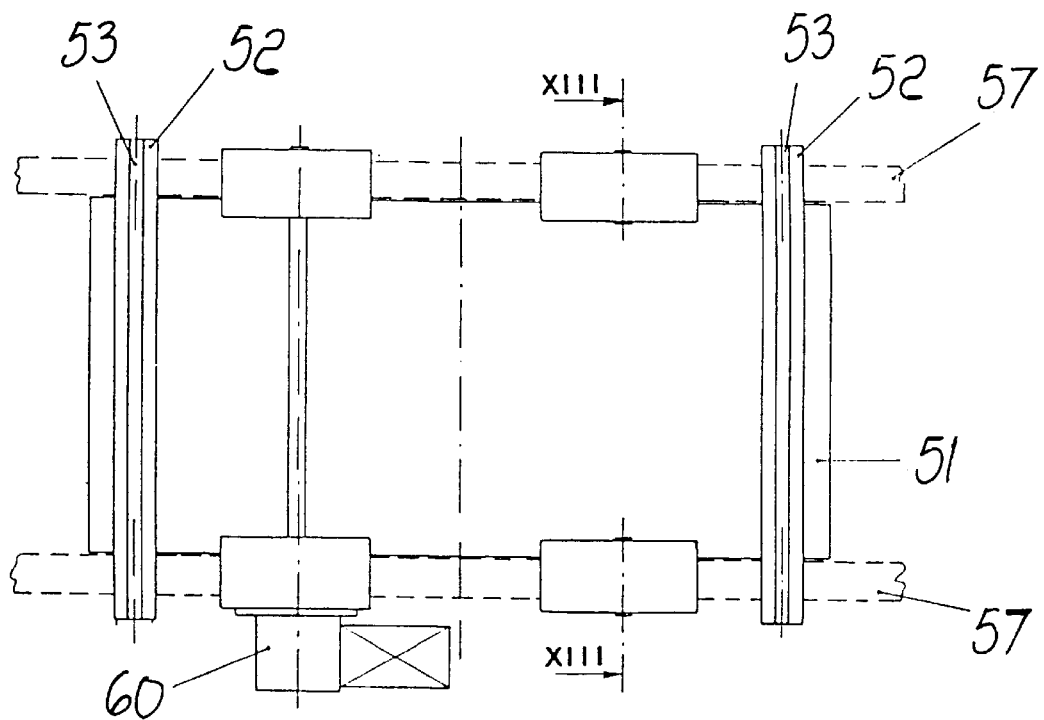
FIG. 14 is a top plan view of the unit for longitudinal transfer of the carriages.

The embodiment shown in FIGS. 12, 13, and 14 relates to a longitudinal shifting unit for the carriages 4, which support the inclined frames 5 and are mounted on a structure 51 that supports the rails 52 and is provided with racks 53 in an upward region.

Wheels 54 and tracking retainers 56 and 56' allow the movement of the shifting unit on the structure 57, which forms the tracks 6–6' shown in FIG. 1.

There are also guiding racks 58 on which the pinions 59 act; said pinions are rigidly coupled to the motion transmission shaft 60, and there is also a particular system for the safety engagement of the carriage, to prevent it from being able to move laterally during longitudinal translatory motion.

Other safety systems are provided to protect the personnel.

Of course, other particular embodiments of the storage system with movable carriages according to the invention may be provided, without altering the essential characteristics thereof and without thereby abandoning the scope of the patent.

What is claimed is:

1. An apparatus for storing and transferring planar products, comprising:
    a plurality carriages for supporting the planar products;
    two transfer units;
    first and second base members, said first base member including a first set of rails and said second base member including a second set of rails, each of said rails extending in a first direction parallel to one another, said first set of rails extend from a first end of said first base member to a second end of said first base member and said second set of rails extend from a first end of said second base member to a second end of said second base member;
    two transverse tracks, one of said transverse tracks disposed at said first ends of said base members and the other one of said transverse tracks disposed at said second ends of said base members, each of said transverse tracks extending in a direction perpendicular to said first direction and including a respective one of said transfer units which transfers said carriages between said first set of rails and said second set of rails; and
    a first parking station and a second parking station, said first parking station disposed adjacent said one of said transverse tracks such that said one of said transverse tracks is disposed between said first parking station and said first end of said first base member, said second parking station disposed at an end of said one of said transverse tracks;
    wherein each of said parking stations holds one of said carriages for transferring the planar products to and from said one of said carriages while the other of said carriages are transferred by said transfer units between said first set of rails and said second set of rails.

2. The apparatus as claimed in claim 1, wherein each of said transfer units comprises a motor with a transmission shaft.

3. The apparatus as claimed in claim 1, wherein each of said transfer units comprises a manual movement unit.

* * * * *